United States Patent [19]

Jovero

[11] Patent Number: 5,181,747
[45] Date of Patent: Jan. 26, 1993

[54] METHOD FOR MANUFACTURING A JOINT AND A JOINT BETWEEN SECTIONS TO BE JOINED TO EACH OTHER AND SURROUNDED BY A JOINING COMPOUND

[75] Inventor: Olli Jovero, Porvoo, Finland

[73] Assignee: Neste Oy, Finland

[21] Appl. No.: 608,249

[22] Filed: Nov. 2, 1990

[30] Foreign Application Priority Data

Nov. 7, 1989 [FI] Finland .................................. 895291

[51] Int. Cl.$^5$ .......................................... F16L 47/02
[52] U.S. Cl. ...................................... 285/21; 285/156;
156/305; 403/191; 403/282; 264/248; 264/249;
264/275
[58] Field of Search ............... 403/191, 205, 233, 234,
403/282; 156/245, 305; 264/241, 248, 259, 275,
249; 285/21, 156

[56] References Cited

U.S. PATENT DOCUMENTS

| 676,582 | 6/1901 | Helmerich | 285/284 X |
| 3,563,276 | 2/1971 | Hight | 285/21 X |
| 3,865,662 | 2/1975 | Segal | 285/21 X |
| 4,576,671 | 3/1986 | Shimanaka | 264/248 X |
| 4,876,041 | 10/1989 | Hanselka | 264/248 X |
| 4,876,788 | 10/1989 | Steer et al. | 264/248 X |
| 4,950,437 | 8/1990 | Lieber | 156/245 X |

Primary Examiner—Randolph A. Reese
Assistant Examiner—Heather Chun
Attorney, Agent, or Firm—Steinberg & Raskin

[57] ABSTRACT

The invention relates to a method for manufacturing a joint, in which method around the sections (14, 15) to be joined to each other sections of a sealing element (12, 13) are placed and the joint (16) is heated by a form (10). A reinforced plastic is used for the joining compound (12, 13), and sections (11a, 11b) of the form (10) are pressed, in a manner known per se, around the members (14, 15) surrounded by the reinforced plastic sealing member sections and to be joined to each other in the joint (16). The invention also relates to a joint manufactured by the aforementioned method.

2 Claims, 1 Drawing Sheet

METHOD FOR MANUFACTURING A JOINT AND A JOINT BETWEEN SECTIONS TO BE JOINED TO EACH OTHER AND SURROUNDED BY A JOINING COMPOUND

BACKGROUND OF THE INVENTION

The invention relates to a method for manufacturing a joint, in which method a joining compound is placed around the members to be joined to each other and the joint is heated by means of a form.

The invention also comprises a joint between members joined to each other and surrounded by a joining compound.

As for the prior art, reference is made to U.S. Pat. No. 4,793,879, in which is described a method for repairing a damaged area of a composite structure. In this known method, a fettling compound is spread on the area to be repaired, which compound is heated via an opposite side of the composite structure, and after this, pressure is increased into the area to be repaired, whereafter the fettling compound is hardened.

SUMMARY OF THE INVENTION

An object of the invention is the construction of a joint manufactured of cold-set plastic or thermoplast, the manufacture of which joint is simple and easy to perform.

Another object of the invention is to develop such a method as can be practiced on site without having to move the members when manufacturing the joint.

For achieving the objects presented above and hereinafter, the method according to the invention is mainly characterized in that a reinforced plastic intermediate product is used as the joining compound and in that the sections of the form are pressed, in a manner known per se, around the members surrounded by the reinforced plastic and to be joined to each other for achieving the joint.

The joint according to the invention is mainly characterized in that the joining compound is a reinforced plastic intermediate product, which is pressed and hardened in place by means of removable sections of the form. Owing to the light-structured, movable sections of the forms to be used, the method according to the invention can readily be performed on the installation site without having to move the structures to be joined to each other when manufacturing the joint.

The joint according to the invention is simple and can be easily manufactured.

BRIEF DESCRIPTION OF THE DRAWINGS

The method and the joint according to the invention are next described with reference to a certain preferred embodiment of the invention shown in the Figures of the drawing.

DESCRIPTION OF THE PREFERRED EMBODIMENT

Figure 1:
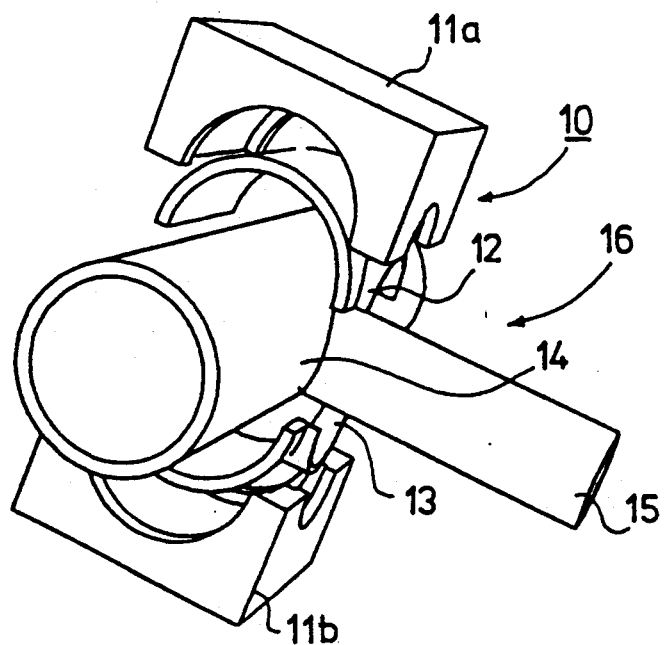
FIG. 1 shows schematically a first phase of the method according to the invention.

In accordance with FIG. 1, in this embodiment of the invention described, a T-joint is manufactured, in which joint pipes 14 and 15 are joined into a T-joint. The members 14, 15 to be joined are positioned in place and around them is fitted a flexible reinforced plastic mass comprising molded joining compound sections 12 and 13. For the joining compound sections a reinforced plastic intermediate product is used, which can be e.g. a sheet molding compound, hereinafter referred to as SMC or a glass mat thermoplastic, hereinafter referred to as GMT. The term "sheet molding compound (SMC)" refers to both a material and a process for producing glass fiber reinforced polyester resin items. The material is basically composed of a filled, thermosetting resin and a chopped or continuous strand reinforcement of glass fiber. An uncomplicated SMC processing machine can produce molding compound in sheet form that is not unlike that of rolled steel. The term "glass mat thermoplastic (GMT)" refers to a fabricate which is basically the same kind of fabricate as SMC, but which uses polypropylene instead of polyester. This fabricate is usually manufactured by extruding two molten polypropylene foils and leading a glass fiber web between molten polypropylene foils. The molten polypropylene impregnates the glass fiber web to form a fabricate mat.

The sections of a form 10 to be heated are marked in the Figure by reference numbers 11a and 11b.

Figure 2:
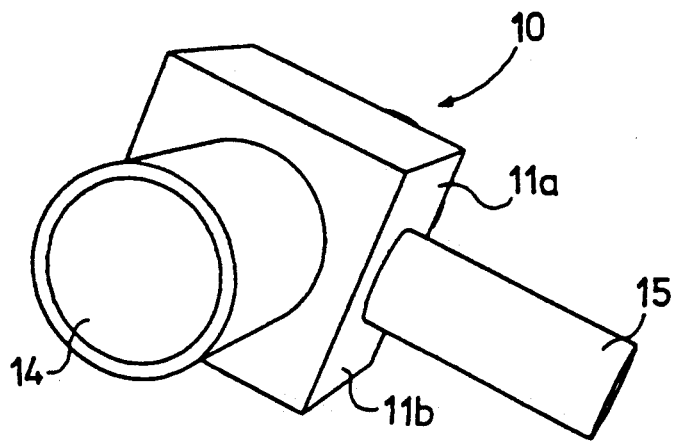
FIG. 2 shows schematically a second phase of the method according to the invention.

In the manufacturing phase of the T-joint shown in FIG. 2, the sections 11a and 11b of the form 10 are pressed around the members 14, 15 and the joining compound sections 12, 13, and the joint 16 is pressed into its form by means of the form 10. The form 10 can be heated, and in this phase heat is conducted into the joint 16.

Figure 3:
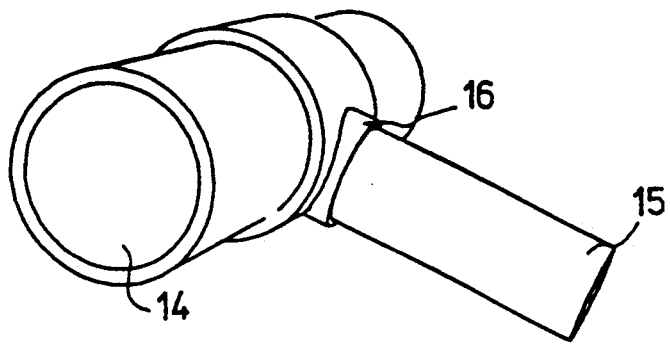
FIG. 3 shows schematically a finished joint achieved by means of the method according to the invention.

In FIG. 3, is shown a finished joint 16 manufactured by means of the method according to the invention. In the method, the form 10, 11 is removed after the necessary hardening and cooling period, whereupon the reinforced plastic joining compound sections have fused into a single sealing member to seal the joint and whereafter the joint is complete.

The invention has above been described with reference to its one preferred embodiment only. However, the intention is not to limit the invention to concern this embodiment only, but many changes and modifications are possible within the inventive idea defined by the accompanying patent claims.

What is claimed is:

1. A method for manufacturing a T-joint between a first pipe member and a second pipe member, said method comprising the steps of:

bringing said first and second pipe members to be jointed into contact with each other;

covering an area between said first and second pipe members to be jointed with an unheated flexible sheet material selected from the group consisting of sheet molding compounds and glass mat thermoplastics and thereafter;

pressing a mold against said sheet material covering said area to be jointed; and heating said mold to harden and join said sheet material to said first and second pipe members; and removing said mold out of contact with said joint area.

2. The method of claim 1, further comprising using a plurality of flexible sections of said sheet material to cover said joint area.

* * * * *